(12) United States Patent
Benda et al.

(10) Patent No.: US 7,624,755 B2
(45) Date of Patent: Dec. 1, 2009

(54) GAS VALVE WITH OVERTRAVEL

(75) Inventors: Jiri Benda, Brno (CZ); Pavel Konecny, Veverska Bityska (CZ)

(73) Assignee: Honeywell International Inc., Morristown, NJ (US)

( * ) Notice: Subject to any disclaimer, the term of this patent is extended or adjusted under 35 U.S.C. 154(b) by 667 days.

(21) Appl. No.: 11/164,906

(22) Filed: Dec. 9, 2005

(65) Prior Publication Data

US 2007/0131286 A1 Jun. 14, 2007

(51) Int. Cl.
*F16K 37/00* (2006.01)
*F16K 31/00* (2006.01)

(52) U.S. Cl. .............. 137/554; 137/516.27; 137/516.29; 137/613; 251/324; 251/363

(58) Field of Classification Search .................. 137/637, 137/613, 554, 516.25, 516.27, 516.29; 251/363, 251/359, 333, 64, 324
See application file for complete search history.

(56) References Cited

U.S. PATENT DOCUMENTS

| | | | |
|---|---|---|---|
| 2,403,692 A | | 7/1946 | Tibbetts |
| 2,975,307 A | | 3/1961 | Schroeder et al. |
| 3,304,406 A | | 2/1967 | King |
| 3,346,008 A | * | 10/1967 | Scaramucci ............ 137/516.29 |
| 3,381,623 A | | 5/1968 | Elliott |
| 3,414,010 A | | 12/1968 | Sparrow |
| 3,641,373 A | | 2/1972 | Elkuch |
| 3,646,969 A | * | 3/1972 | Stampfli .................. 137/627.5 |
| 3,744,754 A | * | 7/1973 | Demi .......................... 251/363 |
| 3,769,531 A | | 10/1973 | Elkuch |
| 3,803,424 A | | 4/1974 | Smiley et al. |
| 3,947,644 A | | 3/1976 | Uchikawa |
| 3,973,976 A | | 8/1976 | Boyd |
| 3,993,939 A | | 11/1976 | Slavin et al. |
| 4,115,036 A | | 9/1978 | Paterson |
| 4,140,936 A | | 2/1979 | Bullock |
| 4,188,013 A | | 2/1980 | Battersby et al. |
| 4,188,972 A | | 2/1980 | van der Zee |
| 4,197,737 A | | 4/1980 | Pittman |
| 4,242,080 A | | 12/1980 | Tabei |
| 4,360,955 A | | 11/1982 | Block |

(Continued)

FOREIGN PATENT DOCUMENTS

DE 19617852 10/1997

(Continued)

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.

(Continued)

*Primary Examiner*—Kevin L Lee

(57) ABSTRACT

A gas valve may include a valve body and a valve member disposed within the valve body. A resilient sealing ring may be disposed within the valve body such that the valve member achieves a closed position when the valve member contacts the resilient sealing ring. In some instances, a gas valve may include both an upper resilient sealing ring and a lower resilient sealing ring. The upper resilient sealing ring and the lower resilient sealing ring may both permit overtravel.

21 Claims, 6 Drawing Sheets

U.S. PATENT DOCUMENTS

| | | | |
|---|---|---|---|
| 4,418,886 A | 12/1983 | Holzer | |
| 4,442,853 A | 4/1984 | Gort | |
| 4,453,169 A | 6/1984 | Martner | |
| 4,478,076 A | 10/1984 | Bohrer | |
| 4,478,077 A | 10/1984 | Bohrer et al. | |
| 4,498,850 A | 2/1985 | Perlov et al. | |
| 4,501,144 A | 2/1985 | Higashi et al. | |
| 4,539,575 A | 9/1985 | Nilsson | |
| 4,543,974 A | 10/1985 | Dietiker et al. | |
| 4,576,050 A | 3/1986 | Lambert | |
| 4,581,624 A | 4/1986 | OConnor | |
| 4,585,209 A | 4/1986 | Aine et al. | |
| 4,619,438 A | 10/1986 | Coffee | |
| 4,651,564 A | 3/1987 | Johnson et al. | |
| 4,654,546 A | 3/1987 | Kirjavainen | |
| 4,722,360 A | 2/1988 | Odajima et al. | |
| 4,756,508 A | 7/1988 | Giachino et al. | |
| 4,815,699 A * | 3/1989 | Mueller | 251/129.11 |
| 4,821,999 A | 4/1989 | Ohtaka | |
| 4,829,826 A | 5/1989 | Valentin et al. | |
| 4,898,200 A | 2/1990 | Odajima et al. | |
| 4,911,616 A | 3/1990 | Laumann, Jr. | |
| 4,938,742 A | 7/1990 | Smits | |
| 4,939,405 A | 7/1990 | Okuyama et al. | |
| 5,065,978 A | 11/1991 | Albarda et al. | |
| 5,069,419 A | 12/1991 | Jerman | |
| 5,078,581 A | 1/1992 | Blum et al. | |
| 5,082,242 A | 1/1992 | Bonne et al. | |
| 5,085,562 A | 2/1992 | van Lintel | |
| 5,096,388 A | 3/1992 | Weinberg | |
| 5,129,794 A | 7/1992 | Beatty | |
| 5,148,074 A | 9/1992 | Fujita et al. | |
| 5,171,132 A | 12/1992 | Miyazaki et al. | |
| 5,176,358 A | 1/1993 | Bonne et al. | |
| 5,180,288 A | 1/1993 | Richter et al. | |
| 5,180,623 A | 1/1993 | Ohnstein | |
| 5,186,054 A | 2/1993 | Sekimura | |
| 5,192,197 A | 3/1993 | Culp | |
| 5,193,993 A | 3/1993 | Dietiker | |
| 5,206,557 A | 4/1993 | Bobbio | |
| 5,215,115 A | 6/1993 | Dietiker | |
| 5,219,278 A | 6/1993 | van Lintel | |
| 5,224,843 A | 7/1993 | van Lintel | |
| 5,244,527 A | 9/1993 | Aoyagi | |
| 5,244,537 A | 9/1993 | Ohnstein | |
| 5,322,258 A | 6/1994 | Bosch et al. | |
| 5,323,999 A | 6/1994 | Bonne et al. | |
| 5,325,880 A | 7/1994 | Johnson et al. | |
| 5,336,062 A | 8/1994 | Richter | |
| 5,368,571 A | 11/1994 | Horres, Jr. | |
| 5,441,597 A | 8/1995 | Bonne et al. | |
| 5,452,878 A | 9/1995 | Gravesen et al. | |
| 5,499,909 A | 3/1996 | Yamada et al. | |
| 5,526,172 A | 6/1996 | Kanack | |
| 5,529,465 A | 6/1996 | Zengerle et al. | |
| 5,536,963 A | 7/1996 | Polla | |
| 5,541,465 A | 7/1996 | Higuchi et al. | |
| 5,552,654 A | 9/1996 | Konno et al. | |
| 5,571,401 A | 11/1996 | Lewis et al. | |
| 5,642,015 A | 6/1997 | Whitehead et al. | |
| 5,683,159 A | 11/1997 | Johnson | |
| 5,696,662 A | 12/1997 | Bauhahn | |
| 5,725,363 A | 3/1998 | Bustgens et al. | |
| 5,735,503 A | 4/1998 | Hietkamp | |
| 5,759,014 A | 6/1998 | van Lintel | |
| 5,759,015 A | 6/1998 | van Lintel et al. | |
| 5,792,957 A | 8/1998 | Luder et al. | |
| 5,808,205 A | 9/1998 | Romo | |
| 5,822,170 A | 10/1998 | Cabuz et al. | |
| 5,836,750 A | 11/1998 | Cabuz | |
| 5,839,467 A | 11/1998 | Saaski et al. | |
| 5,863,708 A | 1/1999 | Zanzucchi et al. | |
| 5,893,389 A * | 4/1999 | Cunningham | 251/359 |
| 5,901,939 A | 5/1999 | Cabuz et al. | |
| 5,911,872 A | 6/1999 | Lewis et al. | |
| 5,944,257 A | 8/1999 | Dietiker et al. | |
| 5,954,079 A | 9/1999 | Barth et al. | |
| 5,971,355 A | 10/1999 | Biegelsen et al. | |
| 6,050,281 A | 4/2000 | Adams et al. | |
| 6,106,245 A | 8/2000 | Cabuz | |
| 6,109,889 A | 8/2000 | Zengerle et al. | |
| 6,116,863 A | 9/2000 | Ahn et al. | |
| 6,122,973 A | 9/2000 | Nomura et al. | |
| 6,151,967 A | 11/2000 | McIntosh et al. | |
| 6,167,761 B1 | 1/2001 | Hanzawa et al. | |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,189,568 B1 | 2/2001 | Bergum et al. | |
| 6,215,221 B1 | 4/2001 | Cabuz et al. | |
| 6,240,944 B1 | 6/2001 | Ohnstein et al. | |
| 6,288,472 B1 | 9/2001 | Cabuz et al. | |
| 6,373,682 B1 | 4/2002 | Goodwin-Johansson | |
| 6,418,793 B1 | 7/2002 | Pechoux et al. | |
| 6,445,053 B1 | 9/2002 | Cho | |
| 6,496,348 B2 | 12/2002 | McIntosh | |
| 6,508,528 B2 | 1/2003 | Fujii et al. | |
| 6,520,753 B1 | 2/2003 | Grosjean et al. | |
| 6,561,791 B1 | 5/2003 | Vrolijk et al. | |
| 6,571,817 B1 | 6/2003 | Bohan, Jr. | |
| 6,579,087 B1 | 6/2003 | Vrolijk | |
| 6,590,267 B1 | 7/2003 | Goodwin-Johansson et al. | |
| 6,640,642 B1 | 11/2003 | Onose et al. | |
| 6,651,506 B2 | 11/2003 | Lee et al. | |
| 6,880,548 B2 | 4/2005 | Schultz et al. | |
| 2002/0078756 A1 | 6/2002 | Akiyama et al. | |
| 2002/0174706 A1 | 11/2002 | Gokhfeld | |
| 2003/0005774 A1 | 1/2003 | Suzuki et al. | |
| 2003/0019299 A1 | 1/2003 | Horie et al. | |
| 2003/0033884 A1 | 2/2003 | Beekuizen et al. | |
| 2003/0189809 A1 | 10/2003 | Ishikura | |
| 2003/0205090 A1 | 11/2003 | Jakobsen | |
| 2004/0035211 A1 | 2/2004 | Pinto et al. | |
| 2004/0060360 A1 | 4/2004 | Chen | |
| 2008/0099082 A1 * | 5/2008 | Moenkhaus | 137/516.27 |

FOREIGN PATENT DOCUMENTS

| | | |
|---|---|---|
| EP | 0744821 | 11/1996 |
| JP | 02-086258 | 3/1990 |
| JP | 05-219760 | 8/1993 |
| SU | 744877 | 6/1980 |
| WO | 9729538 | 8/1997 |
| WO | 0028215 | 5/2000 |
| WO | 0133078 | 5/2001 |

OTHER PUBLICATIONS

Athavale et al., "Coupled Electrostatics-Structures-Fluidic Simulations of a Bead Mesopump," Proceedings of the International Mechanical Engineers Congress & Exhibition, pp. 1-7, Oct. 1999.

Bertz et al., "Silicon Grooves With Sidewall Angles Down to 1° made By Dry Etching", pp. 331-339, prior to Dec. 29, 2004.

Bonne et al. "Actuation-Based Fuel Gas Microsensors", IGT Symposium on "Natural Gas Quality, Energy Measurement, Metering and Utilization Practices", 17 pages, Mar. 2001.

Branebjerg, Gravesen , "A New Electrostatic Actuator Providing Improved Stroke Length and Force." IEEE, pp. 6-11, Feb. 4-7, 1992.

Bustgens et al., "Micropump Manufactured by Thermoplastic Molding" IEEE, pp. 18-21, 1994.

Cabuz et al., "Factors Enhancing the Reliability of Touch-Mode Electrostatic Actuators," Sensors and Actuators 79, pp. 245-250, 2000.

Cabuz et al., "Mesoscopic Sampler Based on 3D Array of Electrostatically Activated Diaphragms," Proceedings of the 10th Int. Conf. On Solid-State Sensors and Actuators, Transducers 1999.

C. Cabuz et al., "The Dual Diaphragm Pump," 4 pages prior to Dec. 29, 2004.

Cabuz, et al., "High Reliability Touch-Mode Electrostatic Actuators", Technical Digest of the Solid State Sensor and Actuator Workshop, Hilton Head, S.C., , pp. 296-299, Jun. 8-11, 1998.

Cabuz. "Tradeoffs in MEMS Materials," SPIE, vol. 2881, pp. 160-170, prior to Dec. 29, 2004.

Cabuz, "Electrical Phenomena at the Interface of Rolling-Contact, Electrostatic Actuators," 16 pages, prior to Dec. 29, 2004.

Cabuz, "Dielectric Related Effects in Micromachined Electrostatic Actuators," IEEE, 1999 Conference on Electrical Insulation and Dielectric Phenomena, pp. 327-332, 1999.

Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.

Halg, "On a Nonvolatile Memory Cell Based on Micro-Electro-Mechanics", IEEE pp. 172-176, 1990.

Minami K et al., "Fabrication of Distributed Electrostatic Micro Actuator (DEMA)," IEEE Journal of Microelectromechanical Systems, vol. 2, No. 3, pp. 121-127, Sep. 1993.

Ohnstein et al., "Micromachined Silicon Microvalve," IEEE, pp. 95-98, 1990.

Porex Technologies, brochure, 4 pages, prior to Dec. 29, 2004.

Shikida et al., "Characteristics of an Electrostatically-Driven Gas Valve Under High Pressure Conditions," IEEE, pp. 235-240, 1994.

Shikida et al., "Fabrication of An S-Shaped Microactuator," IEEE Journal of Microelectromechanical Systems, vol. 6, No. 1, pp. 18-24, Mar. 1997.

Shikida et al., "Electrostatically Driven Gas Valve With High Conductance," IEEE Journal of Microelectromechanical Systems, vol. 3, No. 2, pp. 76-80, Jun. 1994.

Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.

Wagner et al., "Bistable Microvalve with Pneumatically Coupled Membranes," IEEE, pp. 384-388, 1996.

Yang et al., "Fluorescent Porous Polymer Films as TNT Chemosensors: Electronic and Structural Effects", J. Am. Chem. Soc., pp. 11864-11873, 1998.

Yang et al., "Porous Shape Persistent Fluorescent Polymer Films: An Approach to TNT Sensory Materials", J. Am. Chem. Soc., pp. 5321-5322, 1998.

* cited by examiner

GAS VALVE WITH OVERTRAVEL

TECHNICAL FIELD

The present invention pertains generally to valves such as gas valves.

BACKGROUND

A number of gas-fed appliances are known. A gas-fed appliance typically employs a gas valve to control the flow of gas to a burner in which the gas is burned to produce heat. In many cases, a gas valve either permits gas to flow or ceases gas flow in response to a control signal from a control device such as a thermostat or other controller. A need remains for improved gas valves.

SUMMARY

The present invention pertains to an improved gas valve. An example of the present invention may be found in a gas valve that includes a valve body and a valve member that is disposed within the valve body. The valve member may be movable between an open position in which gas is permitted to flow through the valve and a closed position in which gas is not permitted to flow through the valve. A resilient sealing ring may be disposed between the valve member and the valve body. The resilient sealing ring may be adapted to permit the valve member to continue moving beyond a position in which the valve member initially reaches its closed position.

In some instances, the resilient sealing ring may be secured to the valve body. The resilient sealing ring may instead be secured to the valve member. The resilient sealing ring may include a sealing bead that is adapted to seal against the valve body and the valve member. In some cases, the resilient sealing ring may also include a flexible portion that is adapted to permit the sealing bead to move in response to contact with the valve body or the valve member.

Another example embodiment of the present invention may be found in a gas valve that includes a valve body, a valve member that is disposed within the valve body and that is movable between an open position and a closed position, and structure that is adapted to permit overtravel and that is disposed within the valve body. The structure that is adapted to permit overtravel may include a resilient sealing ring that contacts the valve body and the valve member when the valve member is in the closed position. The resilient sealing ring may be configured to permit the valve member to travel beyond a position at which the valve member first contacts the resilient sealing ring.

Another example embodiment of the present invention may be found in a gas valve that includes a valve body and a valve member that is disposed within the valve body. The valve member may include a first disk and a second disk, and may have an open position and a closed position. A first resilient sealing ring may be disposed within the valve body close to the first disk, and a second resilient sealing ring may be secured to the valve member near to the second disk.

When the valve member is in the closed position, the first disk may contact the first resilient sealing ring and the second resilient sealing ring may contact the valve body. In some instances, the first resilient sealing ring and the second resilient sealing ring may each be adapted to permit valve member overtravel. In some instances, the valve member may also include a shaft that extends to a proof of closure switch. The proof of closure switch may, if included, be adapted to provide an indication of valve closure upon overtravel by the valve member.

The first resilient sealing ring may, in some instances, include a sealing bead that is adapted to contact the valve member, a securement portion that is adapted to secure the first resilient sealing ring to the valve body, and a flexible portion that extends between the sealing bead and the securement portion. The first resilient sealing ring may, in some instances, also include a securement ring that is disposed within the securement portion.

The second resilient sealing ring may, in some instances, include a sealing bead that is adapted to contact the valve body, a securement portion that is adapted to secure the second resilient sealing ring to the valve member, and a flexible portion that extends between the sealing bead and the securement portion. The second resilient sealing ring may, in some instances, also include a securement ring that is disposed within the securement portion.

Another example embodiment of the present invention may be found in a valve assembly that includes a first balanced port valve and a second balanced port valve. The first balanced port valve may include a first valve chamber and a first valve member that is disposed within the first valve chamber. The first valve member includes an upper disk and a lower disk. A first upper resilient sealing ring may be secured within the first valve chamber and a first lower resilient sealing ring may be secured to the first valve member.

The second balanced port may include a second valve chamber and a second valve member that is disposed within the second valve chamber. The second valve member may have an upper disk and a lower disk. A second upper resilient sealing ring may be secured to the second valve member and a second lower resilient sealing ring may be secured within the second valve chamber.

In some instances, the first valve member and the second valve member may be separately actuated, while in other cases the first valve member and the second valve member may be actuated in tandem. The first valve chamber may, in some circumstances, be in fluid communication with the second valve chamber. The first valve chamber may, for example, include a fluid inlet while the second fluid chamber includes a fluid outlet. These may of course be disposed in reverse order as well. The first valve chamber may, in some instances, include a pilot light feed.

In some instances, the first valve member may include a first shaft that extends to a first proof of closure switch. The second valve member may include a second shaft that extends to a second proof of closure switch.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
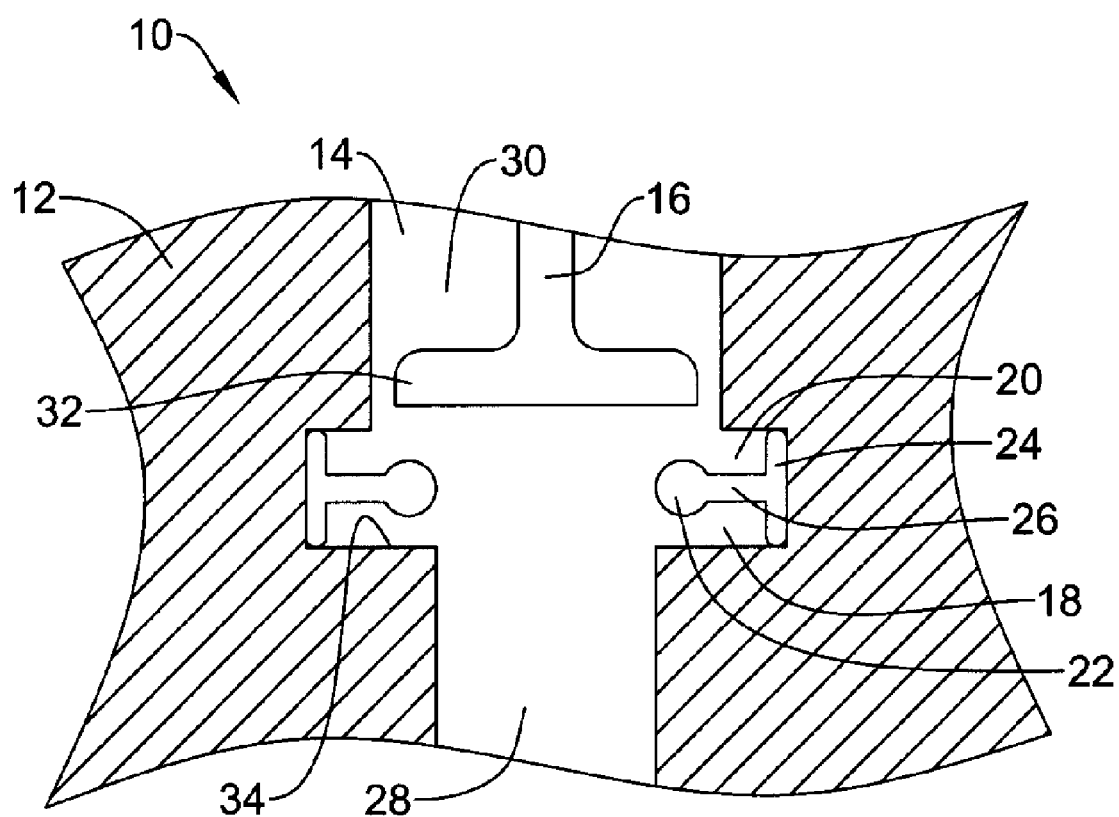
FIG. 1 is a partial cross-sectional view of a portion of a gas valve in accordance with an illustrative embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a partial cross-sectional view of a portion of a gas valve 10 in accordance with an illustrative embodiment of the present invention. The illustrative gas valve 10 includes a valve body 12 defining a valve cavity 14. Valve body 12 may be formed of any suitable material, using any suitable technique. In some instances, valve body 12 may be cast or molded from any suitable metal, plastic, or any other material combination, as desired. A valve member 16 is movably disposed within valve cavity 14. Valve member 16 may be formed of any suitable material. In some cases, valve member 16 may be formed from any suitable material, such as metal, plastic, or any other material or material combination, as desired. In the illustrative embodiment, valve cavity 14 includes a widened portion 18 in which a resilient sealing ring 20 is disposed. In some instances, resilient sealing ring 20 is formed from a resilient material such as rubber or an elastomeric polymer.

In the illustrative embodiment, resilient sealing ring 20 includes a sealing bead 22, an annular securement portion 24 adapted to secure resilient sealing ring 20 to widened portion 18 of valve cavity 14, and an flexible portion 26 extending between sealing bead 22 and annular securement portion 24. Annular securement portion 24 may be secured to valve body 12 in any suitable manner. In some cases, annular securement portion 24 may be adhesively secured to valve body 12. While not illustrated, it is contemplated that annular securement portion 24 may include a metal ring or similar structure to strengthen annular securement portion 24 and/or to facilitate securement of resilient sealing ring 20 within widened portion 18.

Flexible portion 26 may help provide some limited vertical movement of sealing bead 22, as will be discussed in greater detail hereinafter. As illustrated, sealing bead 22 has an at least substantially circular cross-section, but it will be appreciated that other configurations and/or shapes may be used. For example, sealing bead 22 may be ovoid, polygonal or even flat in shape. Moreover, while the individual elements of resilient sealing ring 20 are described herein as being annular (when viewed from above or below), it should be noted that resilient sealing ring 20 may, in some situations, overall have a non-circular shape.

In order to function as a valve, gas valve 10 is movable between an open position in which gas flow is permitted through valve cavity 14 and a closed position in which gas does not flow through valve cavity 14. Valve cavity 14 may be considered as including a lower chamber 28, disposed below resilient sealing ring 20, and an upper chamber 30, disposed above resilient sealing ring 20. In this, upper and lower are relative terms pertaining to the illustrated embodiment. It will be recognized that gas valve 10 may function in any spatial orientation.

In some instances, and as illustrated, valve member 16 may include a disk 32 that is configured to contact sealing bead 22 of resilient sealing ring 20. As seen in FIG. 1, gas valve 10 is in its open position, as gas may flow upward through lower chamber 28, around resilient sealing ring 20 and disk 32, and up and through upper chamber 30. The relative dimensions of lower chamber 28, resilient sealing ring 20 and disk 32 may be determined to accommodate the properties of whichever gas or gases with which gas valve 10 will be employed. Also, reverse flow may be provided if the pressure in upper chamber 30 is higher than the pressure in lower chamber 28. It should be noted that in the open position, sealing bead 22 of resilient sealing ring 20 does not contact surface 34 of valve body 12. This relative spacing may help increase movement of sealing bead 22, as will be discussed with respect to subsequent Figures. However, such a spacing is not required.

Figure 2:
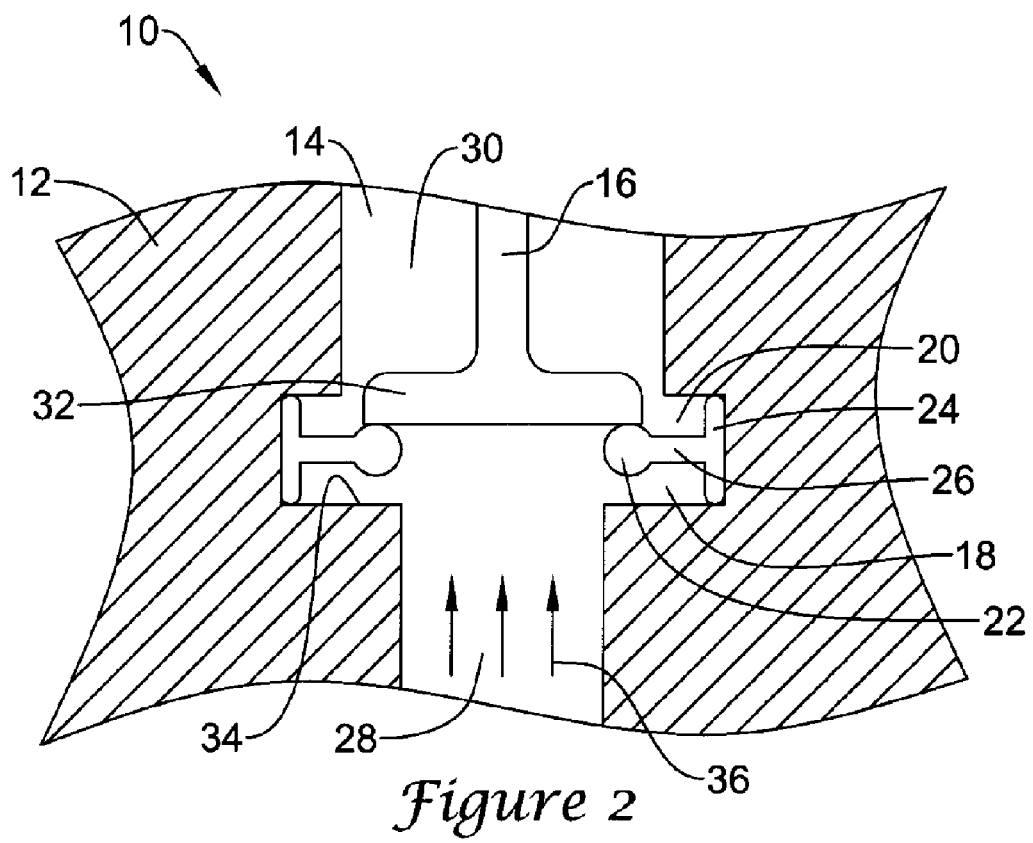
FIG. 2 is a view of the illustrative gas valve of FIG. 1, showing the gas valve in a just-closed position.
Figure 3:
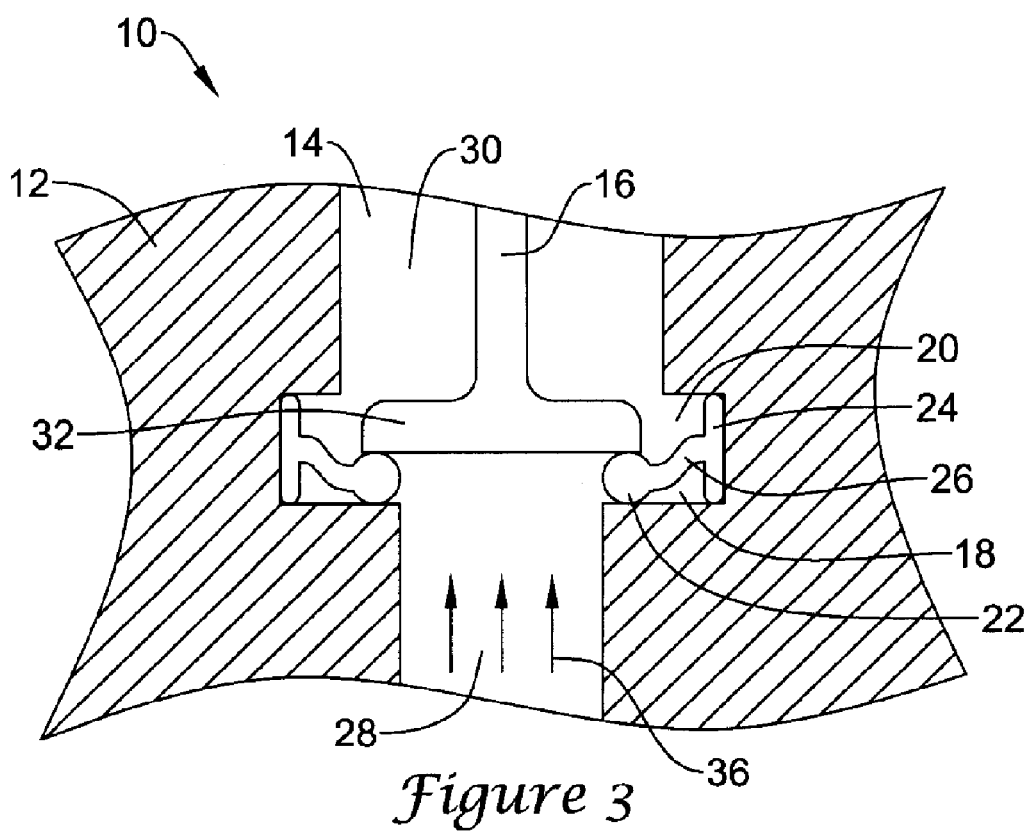
FIG. 3 is a view of the illustrative gas valve of FIG. 2, showing the gas valve in a fully-closed position.

FIGS. 2 and 3 illustrate use of the gas valve 10 of FIG. 1. In FIG. 2, valve member 16 has moved towards resilient sealing ring 20 to a position in which disk 32 just contacts sealing bead 22 of resilient sealing ring 20. At this point, no gas may flow past resilient sealing ring 20 into upper chamber 30, or at least a limited amount of gas may flow. Valve member 16 may be moved in any suitable manner known in the art. For example, valve member 16 may move up and down (in the illustrated orientation) in response to a solenoid, an electric motor, a spring force, or any other appropriate movement mechanism.

In FIG. 3, valve member 16 has moved further, and it can be seen that sealing bead 22 of resilient sealing ring 20 has moved downward into contact with surface 34 of valve body 12. Sealing bead 22 is permitted to move in this manner as a result of flexible portion 26 bending, stretching or otherwise deforming in response to a contact force between widened valve member portion 32 and sealing bead 22 of resilient sealing ring 20.

By comparing FIG. 2 with FIG. 3, overtravel may be seen. The overtravel is the additional distance that valve member 16 is permitted to travel once disk 32 has made initial contact with sealing bead 22 of resilient sealing ring 20 and stopped, or substantially stopped, gas flow past resilient sealing ring 20. The overtravel may compensate for minor dimensional inaccuracies in valve body 12 and/or valve member 16. Moreover, as will be discussed in greater detail with respect to FIG. 4, overtravel may be used to provide evidence that the valve has actually and fully closed.

Figure 4:
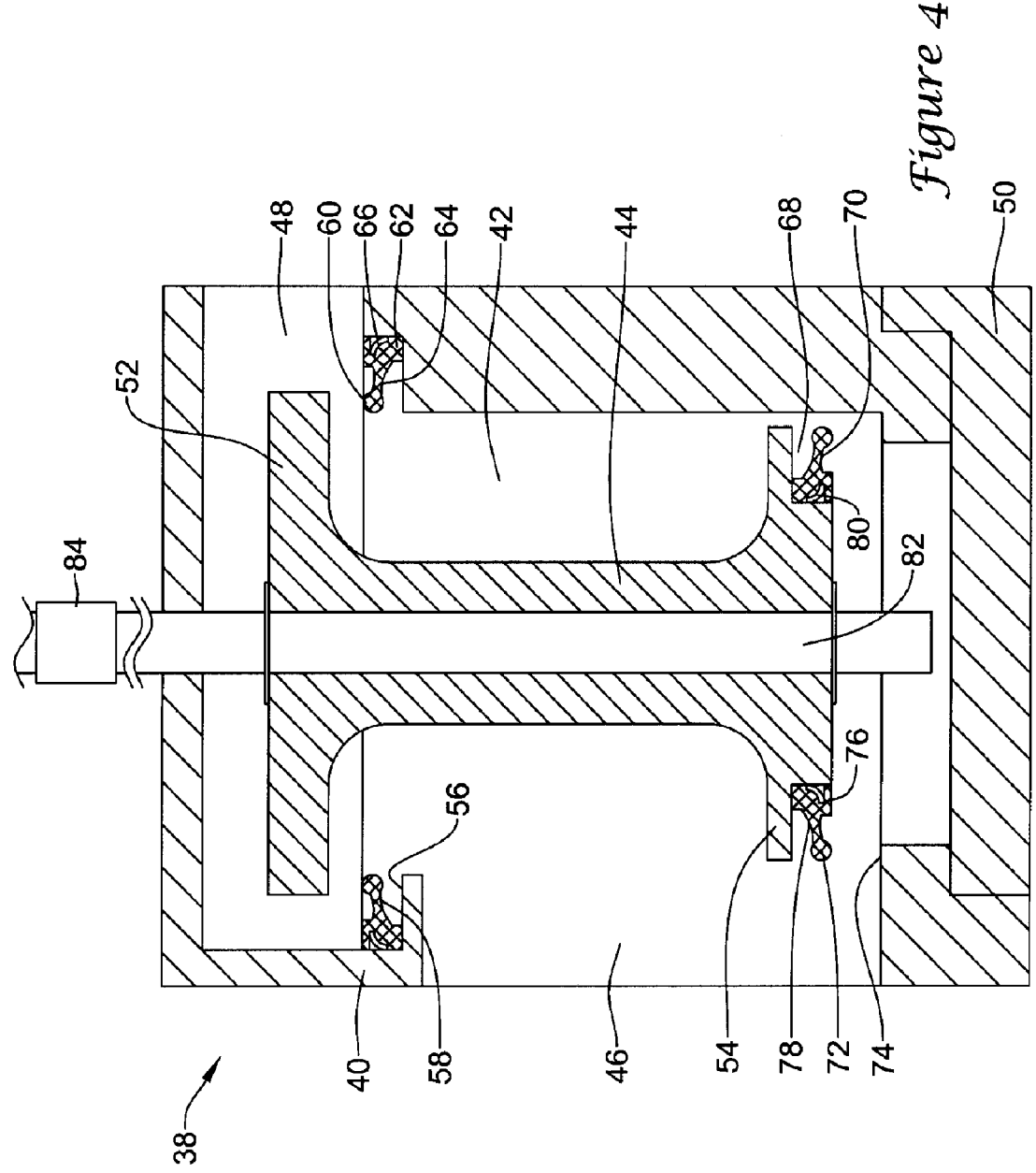
FIG. 4 is a partial cross-sectional view of a gas valve in accordance with an illustrative embodiment of the present invention.

FIG. 4 is a partial cross-sectional view of a portion of a gas valve 38 in accordance with an illustrative embodiment of the present invention. The illustrative gas valve 38 includes a valve body 40 defining a valve cavity 42. Valve body 40 may be formed of any suitable material, using any suitable technique. In some instances, valve body 40 may be cast or molded from any suitable metal, plastic, or any other material combination, as desired. A valve member 44 is movably disposed within valve cavity 42. Valve member 44 may be formed of any suitable material. In some cases, valve member 44 may be formed from any suitable material, such as metal, plastic, or any other material or material combination, as desired.

As illustrated, valve cavity 42 may be seen to encompass several distinct regions within valve body 40. Valve cavity 42 includes an inflow region 46, a first outflow region 48 and a second outflow region 50. It can be seen that in the illustrated embodiment, a gas may enter valve cavity 42 through inflow region 46 and may exit through first outflow region 48 and second outflow region 50.

Valve member 44 may be considered as including a first disk 52 and a second disk 54. Valve body 40 may include, as illustrated, a first inset portion 56 configured to accommodate a first resilient sealing ring 58. First resilient sealing ring 58 includes a first sealing bead 60 that is positioned to contact first disk 52. A first securement portion 62 secures first resilient sealing ring 58 to inset portion 56. A first flexible portion 64 extends between first sealing bead 60 and first securement portion 62 and permits first sealing bead 60 to move in response to contact with first disk 52.

In the illustrated embodiment, first securement portion 62 includes a first securement ring 66 that may assist in securing first resilient sealing ring 58 within first insert portion 56. In some instances, first securement ring 66 may be a metal ring that provides a predetermined shape and size to first resilient sealing ring 58, which may be formed of any suitable resilient material such as rubber or an elastomeric polymer. Inclusion of first securement ring 66 may, for example, permit first resilient sealing ring 58 to be snap-fitted, or perhaps frictionally secured, within first inset portion 56.

It can be seen, particularly in comparison to FIGS. 1, 2 and 3, that first resilient sealing ring 58 may be biased into an angled configuration. As noted above, gas may enter through inlet region 46. Gas flowing past first resilient sealing ring 58, when valve 38 is in the open configuration illustrated, can and may push against first resilient sealing ring 58. By biasing first resilient sealing ring 58 as shown, gas flow will tend to push first sealing bead 60 towards first disk 52, and thus first disk 52 may more quickly contact first sealing bead 60 when valve member 46 is moved towards a closed position. Moreover, by biasing first resilient sealing ring 58 as shown, a greater degree of overtravel may be achieved.

Second disk 54 may include a second inset portion 68 that is configured to accommodate a second resilient sealing ring 70. Second resilient sealing ring 70 includes a second sealing bead 72 that is positioned to contact a surface 74 of valve body 40. A second securement portion 76 secures second resilient sealing ring 70 to second inset portion 68. A second flexible portion 78 extends between second sealing bead 72 and second securement portion 76 and permits second sealing bead 72 to move in response to contact with surface 74.

In the illustrated embodiment, second securement portion 76 includes a second securement ring 80 that may assist in securing second resilient 70 within second insert portion 68. In some instances, second securement ring 80 may be a metal ring that provides a predetermined shape and size to second resilient sealing ring 70, which may be formed of any suitable resilient material such as rubber or an elastomeric polymer. Inclusion of second securement ring 80 may, for example, permit second resilient sealing ring 70 to be snap-fitted, or perhaps frictionally secured, within second inset portion 68.

As discussed with respect to first resilient sealing ring 58, second resilient sealing ring 70 may also be biased into an angled configuration. Gas flowing through inlet region 46 and out through second outlet region 50 can and may push against second resilient sealing ring 70. By biasing second resilient sealing ring 70 as shown, gas flow will tend to push second sealing bead 72 towards surface 74.

Valve member 44 includes a central shaft 82 that extends outwardly from valve body 40. In some instances, as illustrated, central shaft 82 may extend adjacent to, or through, a switch 84. Switch 84 is shown diagrammatically, and may be of any desired construction or design. In some cases, switch 84 may be configured such that it remains open when first sealing bead 60 initially contacts first disk 52 and when second sealing bead 72 initially contacts surface 74, and does not close until at least a limited amount of overtravel has occurred. While gas flow ceases or largely decreases once initial contact has been made, before overtravel occurs, permitting at least a limited amount of overtravel before switch 84 closes may provide proof of closure.

Valve member 44 may be moved in any suitable manner known in the art. For example, valve member 44 may move up and down (in the illustrated orientation) in response to a solenoid, an electric motor, a spring force, or any other appropriate movement mechanism. In some instances, the appropriate mechanisms may be positioned either above or below switch 84.

In some regards, valve 38 may be considered a balanced port valve in that gas entering inflow portion 46 may flow past first disk 52 into first outflow portion 48 as well as past second disk 54 into second outflow portion 50. As gas flows past first disk 52, the gas may exert an upward (as illustrated) force on valve member 44. Similarly, gas flowing past second disk 54 may exert a downward (as illustrated) force on valve member 44. These upward and downwardly applied forces may at least partially cancel each other out, meaning that a smaller net force is needed to move valve member 44 either up or down in order to either open or close valve 38.

Figure 5:
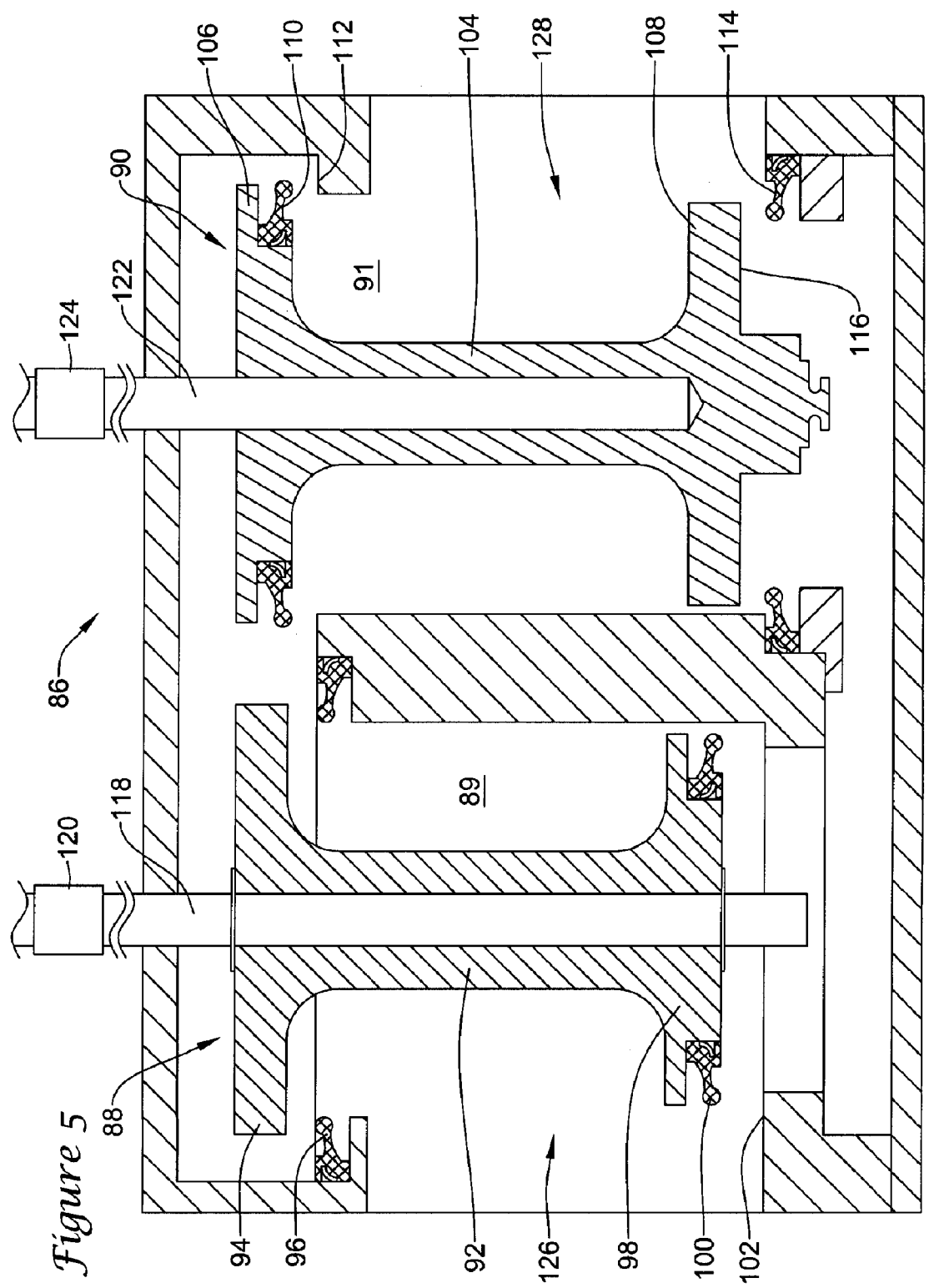
FIG. 5 is a partial cross-sectional view of a portion of a tandem gas valve in accordance with an illustrative embodiment of the present invention, shown in a fully open position.
Figure 6:
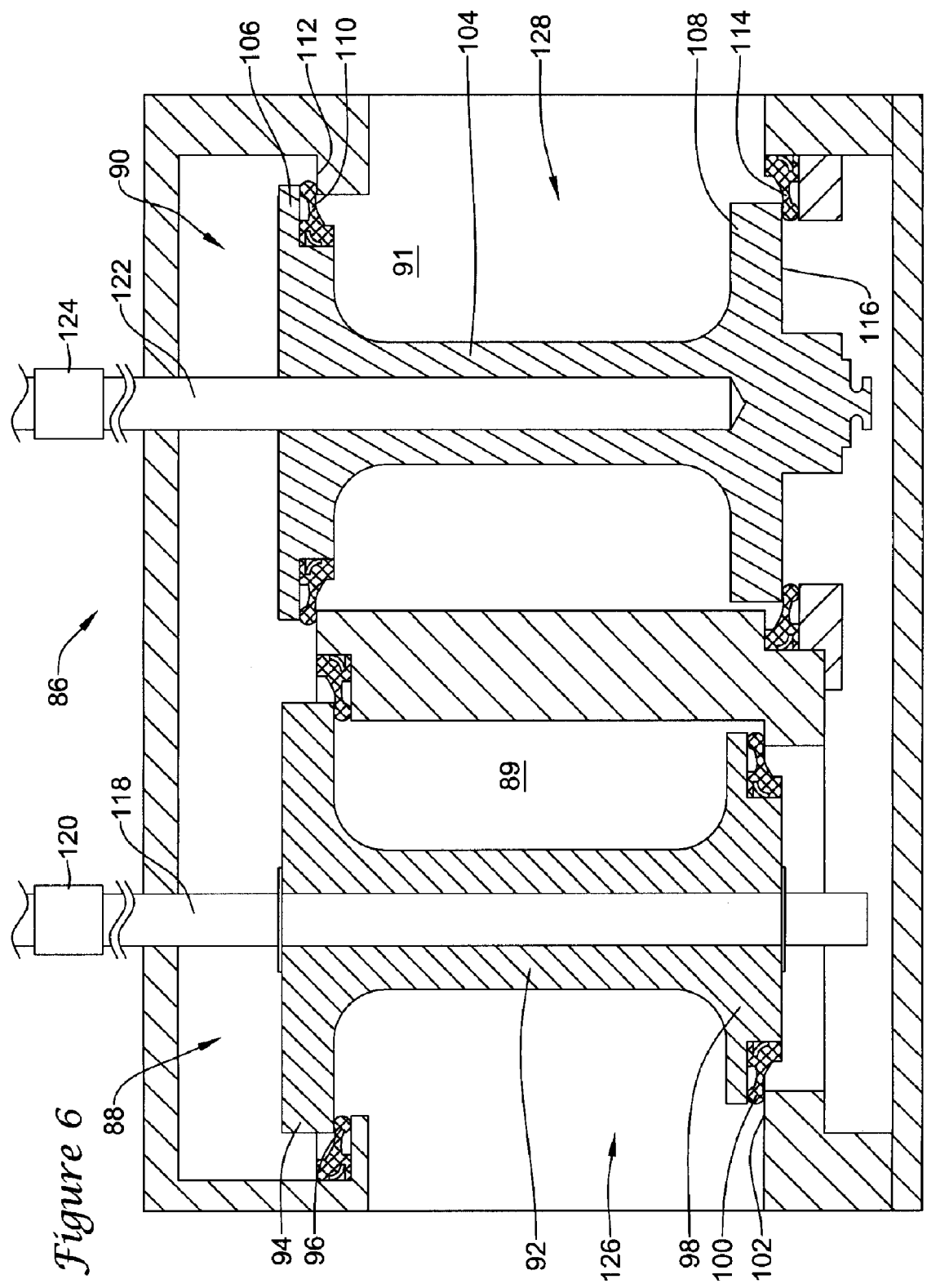
FIG. 6 is a view of the illustrative tandem gas valve of FIG. 5, showing the tandem gas valve in a fully closed position.
Figure 7:
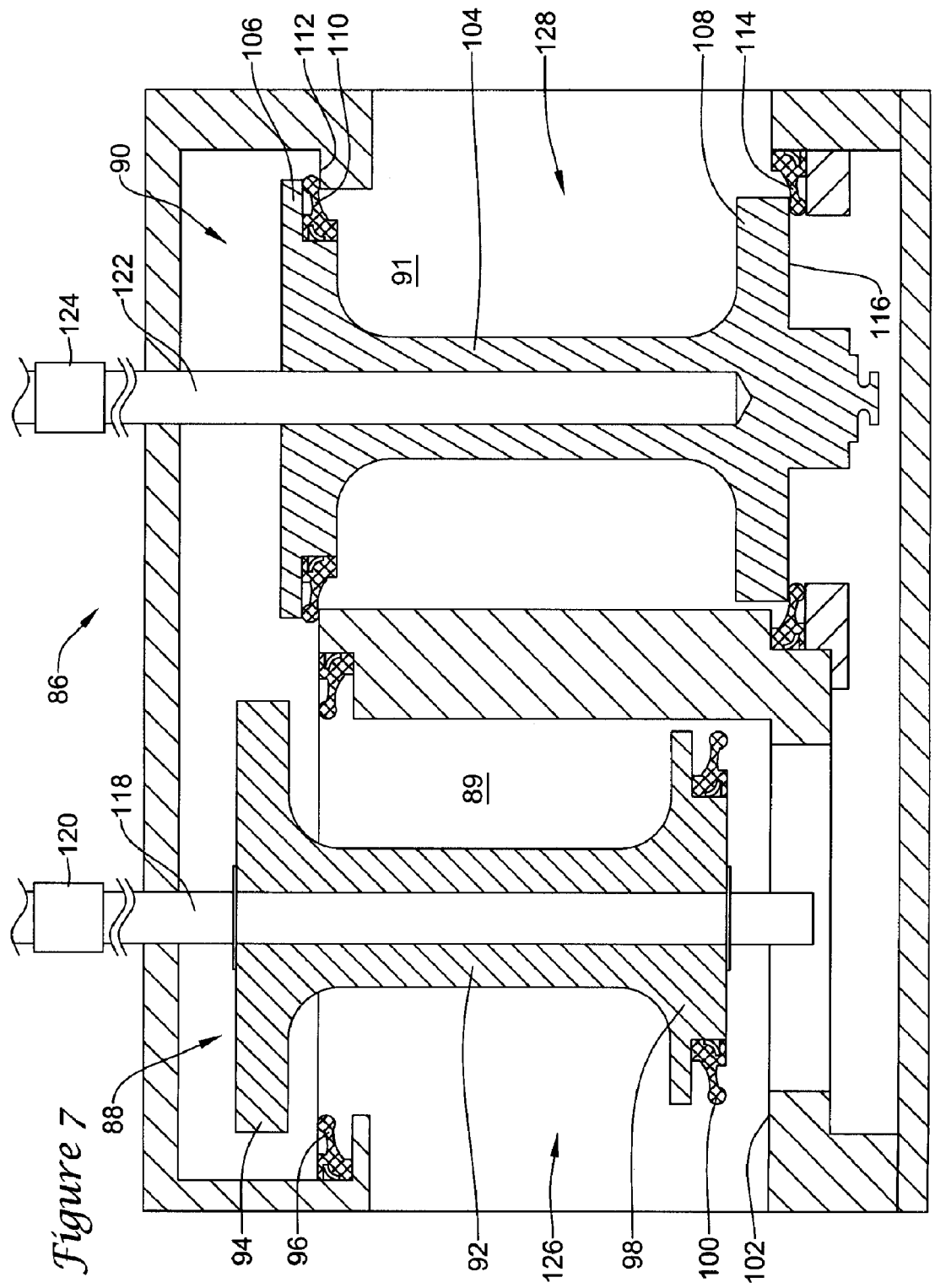
FIG. 7 is a view of the illustrative tandem gas valve of FIG. 5, showing the tandem gas valve in a configuration in which one gas valve is open and one gas valve is closed.

FIGS. 5, 6 and 7 illustrate a tandem gas valve assembly 86 in accordance with an illustrative embodiment of the present invention. The illustrative tandem gas valve assembly 86 has a first balanced port valve 88 including a first chamber 89 and a second balanced port valve 90 including a second chamber 91. First balanced port valve 88 includes a first valve member 92 having a first upper disk 94 and a first lower disk 98. As discussed previously with respect to the earlier Figures, first upper disk 94 may be configured to interact with a first upper resilient sealing ring 96. Similarly, first lower disk 98 may be configured to accommodate a first lower resilient sealing ring 100 adapted to interact with a surface 102.

Second balanced port valve 90 includes a second valve member 104 having a second upper disk 106 and a second lower disk 108. Second upper disk 106 may be configured to accommodate a second upper resilient sealing ring 110, which may be adapted to interact with a surface 112. Similarly, second lower disk 108 may be adapted to interact with a second lower resilient sealing ring 114. Construction details pertaining to first and second upper and lower resilient sealing rings 96, 100, 110 and 114, respectively, are as discussed previously with respect to FIG. 4.

First valve member 92 includes a central shaft 118 that extends outwardly from first balanced port valve 88. In some instances, central shaft 118 may extend adjacent to, or through, a switch 120. Switch 120 is shown diagrammatically, and may be of any desired construction or design. As discussed previously, switch 120 may be configured to close only once first balanced port valve 88 has undergone at least a limited amount of overtravel.

First valve member 92 may be moved in any suitable manner known in the art. For example, first valve member 92 may move up and down (in the illustrated orientation) in response to a solenoid, an electric motor, a spring force, or any other appropriate movement mechanism. In some instances, the appropriate mechanisms may be positioned either above or below switch 120.

Second valve member 104 includes a central shaft 122 that extends outwardly from second balanced port valve 90. In some instances, central shaft 122 may extend adjacent to, or through, a switch 124. Switch 124 is shown diagrammatically, and may be of any desired construction or design. As discussed previously, switch 124 may be configured to close only once second balanced port valve 90 has undergone at least a limited amount of overtravel.

Second valve member 104 may be moved in any suitable manner known in the art. For example, second valve member 104 may move up and down (in the illustrated orientation) in response to a solenoid, an electric motor, a spring force, or any other appropriate movement mechanism. In some instances, the appropriate mechanisms may be positioned either above or below switch 124.

It can be seen that in FIG. 5, first balanced port valve 88 and second balanced port valve 90 are each in an open position in which gas flow is permitted. In FIG. 6, first balanced port valve 88 and second balanced port valve 90 are each in a closed position in which gas flow is at least partially or substantially restricted. FIG. 7 shows an embodiment in which first balanced port valve 88 is open while second balanced port valve 90 is closed.

Tandem gas valve assembly 86 can be seen as including a gas inflow region 126 and a gas outflow region 128. Multiple gas flow paths exist between gas inflow region 126 and gas outflow region 128. Gas may flow from the top of first chamber 89 into the top of second chamber 91. Gas may flow from the bottom of first chamber 89 into the bottom of second chamber 91.

In some instances, gas inflow region 126 and gas outflow region 128 may be the only regions in which fluid may enter or leave tandem gas valve assembly 86. In some cases, first chamber 89 may at least partially form gas inflow region 126. Second chamber 91 may, if desired, form at least a part of gas outflow region 128. In some instances, first balanced port valve 88 and second balanced port valve 90 may operate in tandem.

In order to permit gas to flow, first valve member 92 and second valve member 104 may simultaneously move upward. Alternatively, to prevent or at least reduce gas flow, first valve member 92 and second valve member 104 may simultaneously move downward. In this, up and down merely refer to the illustrated orientation and are not intended to be limiting in any way. If one of the first and second balanced port valves 88 and 90 have a defect, or do not fully close for some reason, the other balanced port valve would still prevent or at least reduce gas flow, thereby providing a fail-safe mechanism.

In some instances, first balanced port valve 88 and second balanced port valve 90 may not always operate in unison. For example, in some instances first balanced port valve 88 may include a supply port (not seen in this diagrammatic cross-section) that provides gas to a pilot light, for example. It will be appreciated that, as shown in FIG. 7, that first balanced port valve 88 may at least partially open in order to provide fuel to a pilot light. Once a controller has received independent confirmation that the pilot light is appropriately lit, then the second balanced port valve 90 may be opened in order to provide fuel for combustion.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A gas valve comprising:
   a valve body;
   a valve member disposed within the valve body, the valve member movable between an open position in which gas flow is permitted through the gas valve and a closed position in which gas flow is not permitted through the gas valve; and
   a resilient sealing ring disposed between the valve member and the valve body, the resilient sealing ring comprising an annular sealing bead and a portion secured to the valve body, the annular sealing bead being spaced apart from a valve body surface when the valve member is in the open position, the valve member moves into contact with the annular sealing bead when the valve member initially reaches its closed position, the annular sealing bead moving into contact with the valve body surface when the valve member exhibits overtravel in moving beyond the position in which the valve member initially reaches its closed position.

2. The gas valve of claim 1, wherein the resilient sealing ring further comprises a flexible portion adapted to permit the sealing bead to move in response to contact with the valve body or the valve member.

3. A gas valve comprising:
   a valve body having a valve cavity, wherein the valve cavity is defined by a valve cavity wall, wherein the valve cavity wall includes a side wall surface and an inward extending surface;
   a valve member disposed within the valve cavity, wherein the valve member includes a side wall and an outwardly extending surface, the valve member is movable between an open position and a closed position; and
   a resilient sealing ring having a sealing bead, a securement portion, and a flexible portion extending between the sealing bead and the securement portion, the securement portion being secured to the side wall of the valve member such that the sealing bead is spaced apart from the outwardly extending surface of the valve member when the valve member is in the open position, wherein the sealing bead moves into contact with the inwardly extending surface of the valve body when the valve member initially reaches its closed position, and the sealing bead moving into contact with the outwardly extending surface of the valve member when the valve member exhibits over travel in moving beyond the position in which the valve member initially reaches its closed position.

4. The gas valve of claim 3, wherein the sealing bead, the securement portion, and the flexible portion each have a maximum dimension in a direction of travel of the valve member, wherein the maximum dimension of the sealing bead is greater than the maximum dimension of the flexible portion.

5. The gas valve of claim 4, wherein the maximum dimension of the securement portion is greater than the maximum dimension of the flexible portion.

6. A gas valve comprising:
a valve body;
a valve member disposed within the valve body, the valve member comprising a first disk and a second disk, the valve member having an open position and a closed position;
a first resilient sealing ring disposed within the valve body proximate the first disk; and
a second resilient sealing ring secured to the valve member proximate the second disk;
wherein when the valve member is in its closed position, the first disk contacts the first resilient sealing ring and the second resilient sealing ring contacts the valve body.

7. The gas valve of claim 6, wherein the first resilient sealing ring and the second resilient sealing ring are each adapted to permit valve member overtravel.

8. The gas valve of claim 6, wherein the first resilient sealing ring comprises a sealing bead adapted to contact the valve member, a securement portion adapted to secure the first resilient sealing ring to the valve body, and a flexible portion extending between the sealing bead and the securement portion.

9. The gas valve of claim 8, wherein the first resilient sealing ring further comprises a securement ring disposed within the securement portion.

10. The gas valve of claim 6, wherein the second resilient sealing ring comprises a sealing bead adapted to contact the valve body, a securement portion adapted to secure the second resilient sealing ring to the valve member, and a flexible portion extending between the sealing bead and the securement portion.

11. The gas valve of claim 10, wherein the second resilient sealing ring further comprises a securement ring disposed within the securement portion.

12. The gas valve of claim 7, wherein the valve member further comprises a shaft extending to a proof of closure switch.

13. The gas valve of claim 12, wherein the proof of closure switch is adapted to provide an indication of valve closure upon overtravel by the valve member.

14. A valve assembly, comprising:
a first balanced port valve comprising:
a first valve chamber;
a first valve member disposed within the first valve chamber, the first valve member having an upper disk and a lower disk; and
a first upper resilient sealing ring secured within the first valve chamber and a first lower resilient sealing ring secured to the first valve member; and
a second balanced port valve comprising:
a second valve chamber;
a second valve member disposed within the second valve chamber, the second valve member having an upper disk and a lower disk; and
a second upper resilient sealing ring secured to the second valve member and a second lower resilient sealing ring secured within the second valve chamber.

15. The valve assembly of claim 14, wherein the first valve member and the second valve member are separately actuated.

16. The valve assembly of claim 14, wherein the first valve member and the second valve member are actuated in tandem.

17. The valve assembly of claim 14, wherein the first valve chamber is in fluid communication with the second valve chamber.

18. The valve assembly of claim 17, wherein the first valve chamber comprises a fluid inlet and the second valve chamber comprises a fluid outlet.

19. The valve assembly of claim 18, wherein the first valve chamber further comprises a pilot light feed.

20. The valve assembly of claim 14, wherein the first valve member further comprises a first shaft extending to a first proof of closure switch.

21. The valve assembly of claim 14, wherein the second valve member further comprises a second shaft extending to a second proof of closure switch.

* * * * *

UNITED STATES PATENT AND TRADEMARK OFFICE
CERTIFICATE OF CORRECTION

PATENT NO. : 7,624,755 B2  Page 1 of 1
APPLICATION NO. : 11/164906
DATED : December 1, 2009
INVENTOR(S) : Benda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this

Twenty-sixth Day of October, 2010

David J. Kappos
*Director of the United States Patent and Trademark Office*